United States Patent
Kuebler et al.

(10) Patent No.: US 6,782,196 B1
(45) Date of Patent: Aug. 24, 2004

(54) FLUID HEATER WITH FREEZE PROTECTION

(75) Inventors: Karl-Heinz Kuebler, Grand Blanc, MI (US); Daryl G. Harris, Oxford, MI (US)

(73) Assignee: Valeo Electrical Systems, Inc., Auburn Hills, MI (US)

(*) Notice: Subject to any disclaimer, the term of this patent is extended or adjusted under 35 U.S.C. 154(b) by 0 days.

(21) Appl. No.: 10/377,342

(22) Filed: Feb. 28, 2003

(51) Int. Cl.$^7$ ............................................. F24H 1/10
(52) U.S. Cl. ................................. 392/484; 137/334
(58) Field of Search ........................... 392/465–485; 137/334–341

(56) References Cited

U.S. PATENT DOCUMENTS

| | | |
|---|---|---|
| 653,629 A | 7/1900 | Schneider |
| 941,215 A | 11/1909 | Wade |
| 1,523,156 A | 1/1925 | Adams |
| 1,636,190 A | 7/1927 | Mattoney |
| 2,833,909 A | 5/1958 | Levey ........................ 219/39 |
| 3,014,251 A | 12/1961 | Sstern ....................... 20/40.5 |
| 3,202,447 A | 8/1965 | Whaley ..................... 294/87.2 |
| 3,292,866 A | 12/1966 | Benner ...................... 239/284 |
| 3,332,045 A | 7/1967 | Rodaway .................... 335/81 |
| 3,338,476 A | 8/1967 | Marcoux .................... 222/146 |
| 3,427,675 A | 2/1969 | Tibbet |
| 3,489,884 A | 1/1970 | Wasekeski ................. 219/522 |
| 3,553,428 A | 1/1971 | McGhee .................... 219/494 |
| 3,632,042 A | 1/1972 | Goulish ..................... 239/130 |
| 3,668,757 A | 6/1972 | Rieden ...................... 29/157.3 |
| 3,716,886 A | 2/1973 | Klomp ...................... 15/250.04 |
| 3,756,510 A | 9/1973 | Nitterl ........................ 239/129 |
| 3,785,359 A | 1/1974 | Wittaker .................... 126/19.5 |
| 3,888,412 A | 6/1975 | Lundo ....................... 237/12.3 B |
| 3,891,827 A | 6/1975 | Wyse ......................... 219/302 |
| 3,977,436 A | 8/1976 | Larmer ...................... 137/625.65 |
| 3,979,068 A | 9/1976 | Applebaum .............. 239/284 R |
| 4,090,668 A | 5/1978 | Kochensur ................. 239/130 |
| 4,106,508 A | 8/1978 | Berlin ........................ 128/346 |
| 4,159,026 A | 6/1979 | Williamson .............. 137/625.5 |
| 4,177,375 A | 12/1979 | Meixner ..................... 219/441 |
| 4,212,425 A | 7/1980 | Schlick ....................... 239/133 |
| 4,248,383 A | 2/1981 | Savage ....................... 239/284 |
| 4,253,493 A | 3/1981 | English ...................... 137/625.18 |
| 4,295,111 A | 10/1981 | Frosch ....................... 335/256 |
| 4,295,769 A | 10/1981 | Douthett .................... 411/411 |
| 4,306,589 A | 12/1981 | Harned ...................... 137/625.65 |
| 4,343,988 A | * 8/1982 | Roller et al. ............... 392/467 |
| 4,358,652 A | 11/1982 | Kaarup |
| 4,403,756 A | 9/1983 | Berlin ........................ 244/223 |
| 4,417,116 A | 11/1983 | Black |

(List continued on next page.)

FOREIGN PATENT DOCUMENTS

| | | |
|---|---|---|
| AU | 222081 | 11/1957 |
| CA | 1216713 | 1/1987 |
| CA | 2133592 | 4/1995 |
| CA | 2176539 | 11/1997 |
| DE | 854 403 | 11/1952 |
| DE | 23 53 738 | 9/1980 |
| DE | 3430 653 | 8/1984 |
| DE | 3 507 900 | 11/1986 |
| DE | 35 26 430 | 5/1987 |
| DE | 39 07 968 | 9/1990 |
| DE | 19820220 | 11/1999 |
| DE | 19935134 | 1/2001 |
| EP | 1 006 030 | 11/1999 |
| EP | 7 006 029 | 11/1999 |
| EP | 1 213 197 | 12/2000 |
| EP | 1162118 | 12/2001 |
| FR | 2 585 311 | 1/1987 |
| FR | 2 605 273 | 4/1988 |
| FR | 2 609 437 | 7/1988 |
| FR | 2 677 939 | 12/1992 |
| FR | 2 707 230 | 7/1993 |
| GB | 370687 | 5/1931 |
| GB | 1 318 498 | 5/1973 |
| GB | 1 451 666 | 10/1974 |
| GB | 2 044 601 | 10/1980 |
| GB | 2 121 681 | 1/1984 |
| GB | 2 225 096 | 5/1990 |
| GB | 2 260 399 | 4/1993 |
| GB | 2 271 276 | 4/1994 |
| GB | 2 271 712 | 4/1994 |
| GB | 2 290 461 | 1/1996 |
| GB | 2 308 971 | 7/1997 |
| GB | 2 310 795 | 9/1997 |
| GB | 2 331 231 | 5/1999 |
| GB | 2354 688 | 11/2000 |
| GB | 2 350 555 | 12/2000 |
| JP | 63-93652 | 4/1988 |
| JP | 2053656 | 2/1990 |
| JP | 2234866 | 9/1990 |
| JP | 4-38248 | 2/1992 |
| JP | 8312824 | 11/1996 |
| WO | WO 9746431 | 12/1997 |
| WO | WO 98/49036 | 11/1998 |
| WO | WO 98/58826 | 12/1998 |
| WO | WO 99/56993 | 11/1999 |
| WO | WO 00/04754 | 2/2000 |
| WO | WO 00/27540 | 5/2000 |
| WO | WO 02/92237 | 11/2002 |

*Primary Examiner*—Thor Campbell
(74) *Attorney, Agent, or Firm*—J. Gordon Lewis (57) ABSTRACT

A heat source is disposed in the thermally conductive mass housing for imparting heat to the mass. Fluid in a flow path through the mass absorbs heat from the mass. A fluid expansion member is mounted over open ends of the fluid flow path. The fluid expansion member, in one aspect, is formed of a compressible material to compress under the forces of fluid phase change to a solid state and expands back to a nominal shape when the fluid undergoes a reverse phase change to a liquid state. In another aspect, the fluid expansion member is a solid seal member overlaying the open ends of the fluid flow channels. The seal resists expansion under normal fluid operating pressures, but expands into an open interior chamber in a closure fixed to the mass to accommodate a phase change expansion of the fluid.

41 Claims, 11 Drawing Sheets

U.S. PATENT DOCUMENTS

| | | | |
|---|---|---|---|
| 4,430,994 A | 2/1984 | Clawson | 128/203.27 |
| 4,489,863 A | 12/1984 | Horehos | 222/504 |
| 4,508,957 A | 4/1985 | Rocchitelli | 219/305 |
| 4,524,797 A | 6/1985 | Lungu | 137/343 |
| 4,534,539 A | 8/1985 | Dettmann | 251/65 |
| 4,561,632 A | 12/1985 | Hugler | 251/129.15 |
| 4,574,841 A | 3/1986 | Hugler | 137/625.44 |
| 4,589,374 A | 5/1986 | Farina | 122/14 |
| 4,669,430 A | 6/1987 | Reinold | 123/179 |
| 4,687,907 A * | 8/1987 | Barkley et al. | 392/473 |
| 4,689,548 A | 8/1987 | Mechlemburg | 323/243 |
| 4,690,371 A | 9/1987 | Bosley | 251/65 |
| 4,832,262 A | 5/1989 | Robertson | 239/129 |
| 4,858,576 A | 8/1989 | Jeffries | 123/145 |
| 4,877,186 A | 10/1989 | Scholl | 239/75 |
| 4,894,520 A | 1/1990 | Moran | 219/497 |
| 4,905,904 A | 3/1990 | Ohara | 239/284.1 |
| 4,927,060 A | 5/1990 | Snowball | 222/146.5 |
| 4,975,630 A | 12/1990 | Ma | 323/300 |
| 5,012,977 A | 5/1991 | Karklins | 239/284.1 |
| 5,074,471 A | 12/1991 | Baumgarten | 239/284.1 |
| 5,118,040 A | 6/1992 | Abe | 239/284.1 |
| 5,168,595 A | 12/1992 | Naylor, Jr. | 15/250.4 |
| 5,180,896 A | 1/1993 | Gibby | 219/10.55 |
| 5,183,099 A | 2/1993 | Bechu | 165/41 |
| 5,203,049 A | 4/1993 | Nogawa | 15/250.02 |
| 5,247,148 A | 9/1993 | Mencher | 219/10.55 |
| 5,249,623 A | 10/1993 | Muller | 165/156 |
| 5,254,083 A | 10/1993 | Gentelia | 604/35 |
| 5,280,806 A | 1/1994 | Glazebrook | 137/517 |
| 5,289,698 A | 3/1994 | Garimella | 62/498 |
| 5,318,071 A | 6/1994 | Gaiardo | 137/625.65 |
| 5,345,968 A | 9/1994 | Day | 137/625.46 |
| 5,351,934 A | 10/1994 | Jensen | 251/65 |
| 5,354,965 A | 10/1994 | Lee | 219/202 |
| 5,369,247 A | 11/1994 | Doljack | 219/485 |
| 5,383,247 A | 1/1995 | Nickel | 15/250.04 |
| 5,421,727 A | 6/1995 | Stevens | |
| 5,428,206 A | 6/1995 | Uchida | 219/505 |
| 5,433,382 A | 7/1995 | Baumgarten | 239/284.1 |
| 5,509,606 A | 4/1996 | Breithayst | 239/130 |
| 5,598,502 A | 1/1997 | Takahashi | 392/502 |
| 5,636,407 A | 6/1997 | Len | 15/250.19 |
| 5,673,360 A | 9/1997 | Scripps | 392/405 |
| 5,676,868 A | 10/1997 | Simmons | 219/202 |
| 5,727,769 A | 3/1998 | Suzuki | 251/129.15 |
| 5,784,751 A | 7/1998 | Tippets | 15/250.04 |
| 5,881,428 A | 3/1999 | Simmons | 15/250.04 |
| 5,927,608 A | 7/1999 | Scorirobli | 239/284.1 |
| 5,947,348 A | 9/1999 | Briski | 222/640 |
| 5,957,384 A | 9/1999 | Lansinger | 239/284.1 |
| 5,979,796 A | 11/1999 | Ponziani | 239/284.1 |
| 5,988,529 A | 11/1999 | Suhring | 239/284.1 |
| 6,009,369 A | 12/1999 | Boisvert | 701/99 |
| 6,029,908 A | 2/2000 | Petzold | 239/284.1 |
| 6,032,324 A | 3/2000 | Lansinger | 15/250.04 |
| 6,119,300 A | 9/2000 | Schmid | 15/250.04 |
| 6,133,546 A | 10/2000 | Bains | 219/202 |
| 6,148,258 A | 11/2000 | Boisvert | 701/99 |
| 6,164,564 A | 12/2000 | Franco | 239/284.1 |
| 6,199,587 B1 | 3/2001 | Shlomi | 137/625.5 |
| 6,236,019 B1 | 5/2001 | Piccione | 219/203 |
| 6,247,653 B1 | 6/2001 | Seyfarth | 239/284.1 |
| 6,257,500 B1 | 7/2001 | Petzold | 239/284.1 |
| 6,260,608 B1 | 7/2001 | Kim | 165/41 |
| 6,271,506 B1 | 8/2001 | Glaser | 219/505 |
| 2002/0040895 A1 | 4/2002 | Lopez et al. | |
| 2002/0137455 A1 | 9/2002 | Ivanov et al. | |

* cited by examiner

FLUID HEATER WITH FREEZE PROTECTION

BACKGROUND

This invention relates, in general, to fluid heater apparatus and, more particularly, to fluid heater apparatus which provides a heated wash fluid to a cleanable surface, and, still more specifically, to a heated wash fluid apparatus for a vehicle windshield wash system.

It is necessary in many diverse applications to quickly elevate the temperature of a fluid to a higher use temperature. For example, it is desirable to be able to provide instant hot water, for use in homes, offices and campers, as well as for industrial processes.

In cleaning applications, it is known that hot fluid removes dirt and other debris from a surface much better and much faster than colder fluids. One heated fluid application is a vehicle wash fluid system, such as a windshield wash system as well as vehicle wash systems applied to camera lenses, exterior lamps and lamp lenses, mirrors, etc. Vehicles are typically provided with at least one and usually multiple windshield washers which are used to clear the field of vision in a windshield or rear backlight.

Typically, a nozzle or spray device is provided adjacent to or as part of the windshield wiper to disperse a pattern of wash fluid onto the windshield prior to and during the wiping operation to improve the efficiency of the wiping operation so as to provide a clear field of vision for the driver or vehicle passengers. The wash fluid is typically stored in a reservoir in the engine compartment and is pumped through the spray device upon manual activation of a control actuator by the vehicle driver.

Since it is known that warm or heated fluid provides better cleaning efficiency than cold fluid, it is known to provide a heated wash fluid to a vehicle window spray device. Various wash fluid heating devices have been developed, but all typically utilize a heat exchanger design wherein a heat source is disposed in a body through which the wash fluid flows. The wash fluid picks up heat in the heat exchange body which elevates its temperature prior to dispersion through the spray nozzle onto a vehicle window.

A vehicle wash device is subject to a wide range of temperatures and types of fluid. It is possible and fairly common that consumers may use only water as a vehicle wash fluid. However, at sub-freezing conditions, this may result in damage to the fluid storage device due to expansion caused by the phase change of water to a solid state. The resulting damage may cause leaks, fractures, yield of materials, or a general malfunction of the fluid heater.

Thus, it would be desirable to provide a fluid heater apparatus providing a heated fluid which has fluid freeze protection. It would also be desirable to provide a fluid heater apparatus which provides freeze protection without a substantial increase in the number of components employed in the fluid heater apparatus.

SUMMARY

The present invention is a fluid heater apparatus with unique freeze protection means. The freeze protection means reversibly allows expansion of the fluid in the fluid heater when the fluid undergoes a phase change to a solid or semi-solid state and is reversible to a normal state overlaying the fluid flow channels when the fluid undergoes a phase back to a liquid state.

In one aspect, the heater apparatus includes a thermally conductive mass, heating means thermally coupled to the thermally conductive mass for imparting heat to the thermally conductive mass, and a fluid flow path formed in the thermally conductive mass between an inlet and an outlet. Fluid in the fluid flow path absorbs heat from the thermally conductive mass.

In one aspect, the heater apparatus further includes a fluid expansion means carried in a closure carried on the mass for reversibly allowing expansion of fluid in the fluid flow path when the fluid undergoes a phase change to a solid state.

In one aspect, the fluid expansion means is in the form of a compressible member which may be formed of a closed cell foam. The compressible member is disposed in an enlarged interior chamber formed in the closure or plate attached in the thermally conductive mass and overlays the ends of the fluid flow channels in the thermal mass.

In another aspect, the present invention is a wash apparatus including a fluid reservoir contain a wash fluid, a pump coupled to the fluid reservoir for pumping fluid from the reservoir, a spray nozzle fluidically coupled to the pump for discharging fluid pumped from the reservoir onto a cleanable surface, and the heater apparatus disposed in fluid flow communication between the pump, the reservoir and the nozzle.

In this aspect, a fluid expansion means carried in the closure for reversibly allowing expansion of fluid in the fluid flow path when the fluid undergoes a phase change to a solid state.

The fluid expansion means may also be provided with fluid flow apertures which allow fluid flowing through a portion of the fluid flow channels in the thermal mass to flow through the fluid expansion means and impinge against the inner surface of the closure on the thermally conductive mass. This enables heat to be removed from the high heat generating power switch elements mounted on a circuit board on one closure as well as allowing fluid to impinge more closely on the portion of the closure on which the thermal sensor is mounted to provide a more accurate temperature measurement of the fluid of the fluid heater apparatus.

In another aspect of the invention, a fluid expansion means is provided by the seal members having a solid shape overlaying substantially all of the open ends of the fluid flow channels on one surface of the thermal conductive mass. Each seal member has sufficient rigidity to resist expansion or movement when exposed to the normal operating pressures of the fluid flowing through the fluid flow channels. However, expansion of the fluid in the channels caused by the change of phase of the fluid to a solid or semi-solid state exerts sufficient pressure on the seals to cause the seals to expand into an adjacent open interior cavity formed in the closure to accommodate the fluid phase change expansion. The seals assume their normal generally planar shape when the fluid changes phase back to a liquid state.

The fluid heater of the present invention has a unique freeze protection means which accommodates phase change expansion of the fluid in the fluid heater when the fluid transitions to a semi-solid or solid state, but is capable of returning to a normal shape and position overlaying open ends of the fluid flow channels in the thermally conductive mass when the fluid reverses phase to a liquid state.

The fluid expansion means is easily accommodated in a fluid heater apparatus with minor modifications.

BRIEF DESCRIPTION OF THEE DRAWING

The various features, advantages and other uses of the present invention will become more apparent by referring to the following detail description and drawing in which.

DETAILED DESCRIPTION

Figure 1:
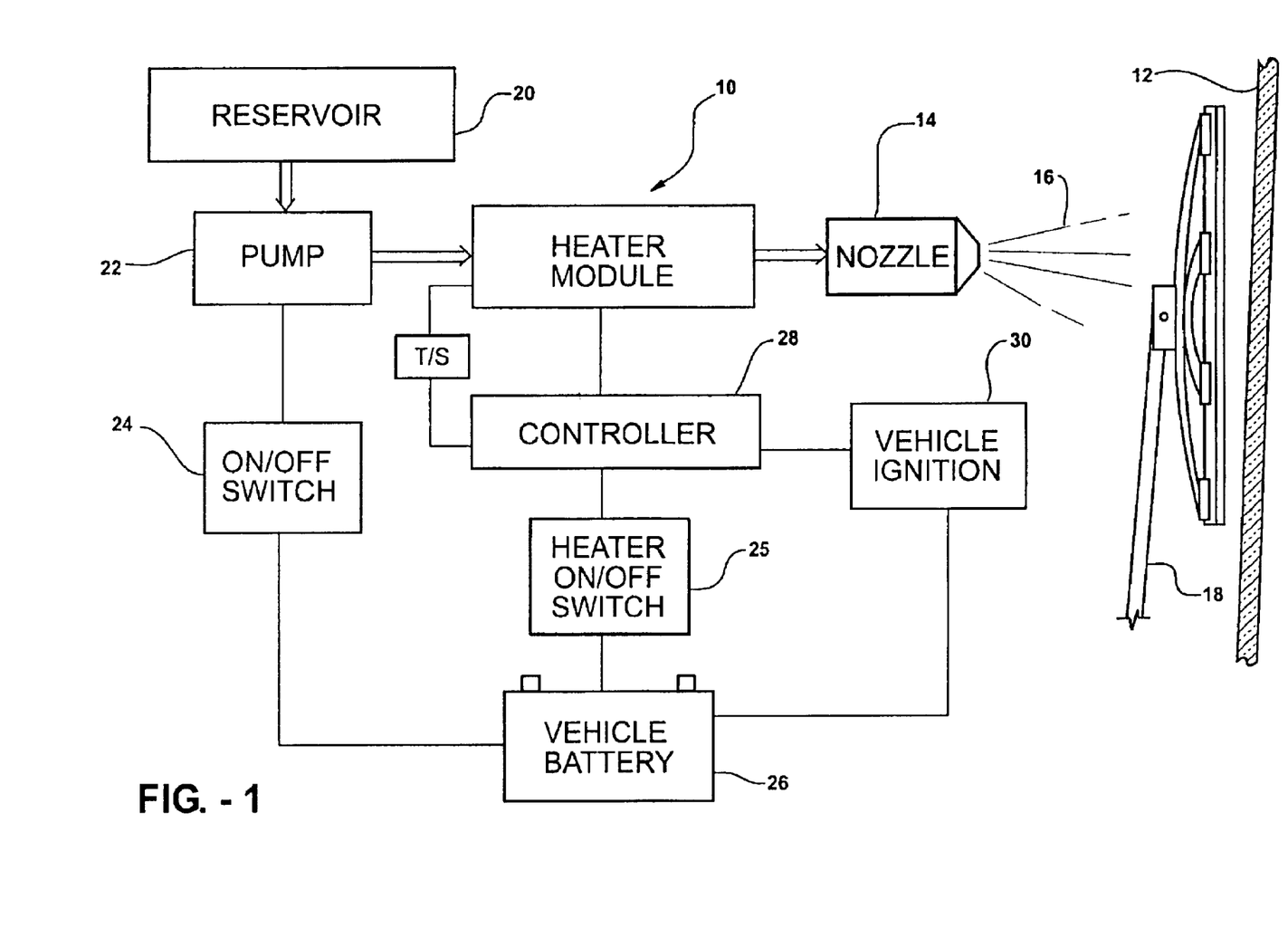
FIG. 1 is a block diagram of a fluid heater apparatus according to the present invention used in an exemplary vehicle window wash fluid delivery system.
Figure 2:
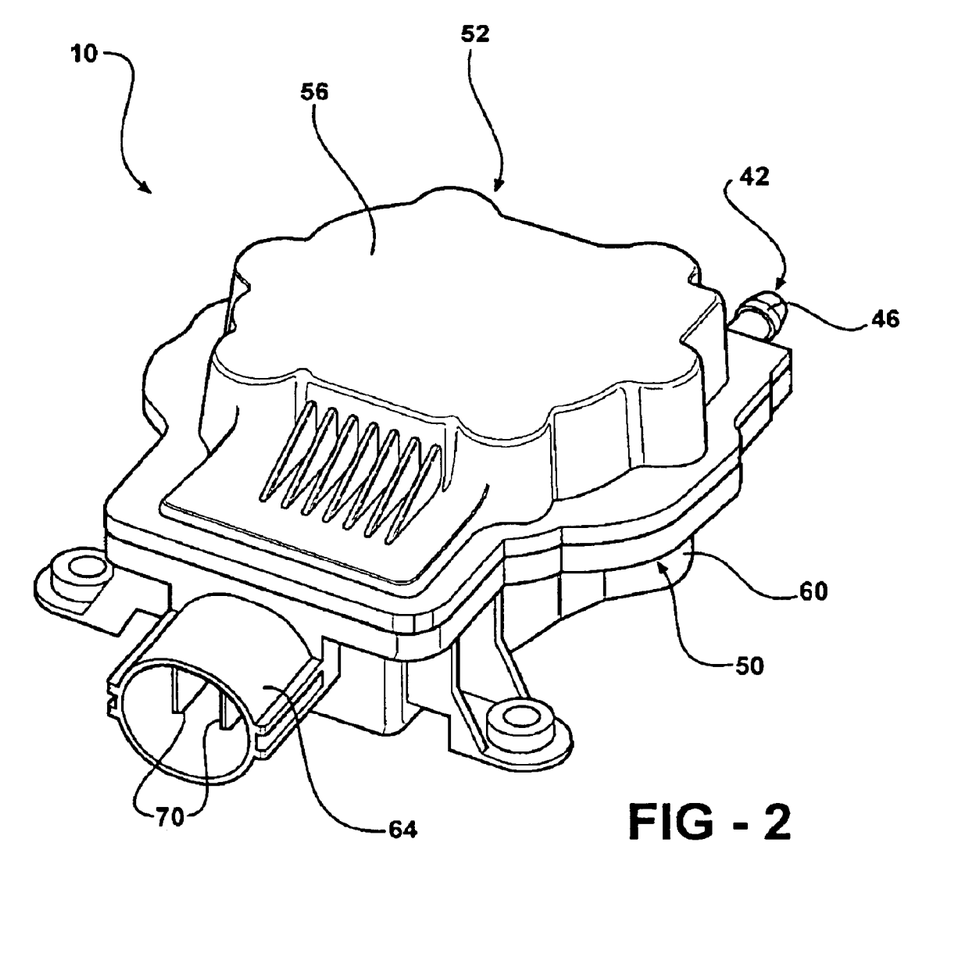
FIG. 2 is a perspective view of a heater module or the fluid heater apparatus according to one aspect of the present invention.

Referring now to FIG. 1, there is depicted an environment in which a heater apparatus or module 10 constructed in accordance with the teachings of the present invention can be advantageously utilized. Although the following use of the heater module 10 of the present invention is described in conjunction with a vehicle window wash system, it will be understood that the present heater module may be employed in other applications requiring heated fluid, such as any cleaning system used to clean any vehicle window, i.e., the windshield, rear backlight, or side windows, as well as cleaning systems for vehicle mirrors, camera, lenses, or sensor covers, etc.

As is conventional, a vehicle window 12, such as a windshield, rear backlight or window, etc., has one or more fluid delivery devices, such as spray nozzles 14 located in a position to dispense or spray a pattern 16 of wash fluid onto the exterior surface of the window 12. The dispersion of the wash fluid 16 is usually in conjunction with activation of a windshield wiper 18 over the window 12.

The wash fluid 16 is supplied from a fluid source, such as a reservoir or container 20. The fluid in the reservoir 20 is pumped to the nozzle(s) 14 by means of a pump 22 usually located in close proximity or attached to the reservoir 20.

As is conventional, an on/off switch 24, which may be mounted on a vehicle steering column stalk switch, is suppled with power from the vehicle battery 26 and enables the vehicle driver to control the on or off operation of the wash pump 22.

According to the invention, the wash fluid pumped from the reservoir 20 to the spray nozzles 14 is heated from ambient temperature to a predetermined higher temperature, such as about 65° C. to about 70° C., by example only, by the heater module 10. A suitable control circuit or controller 28 is provided for controlling the operation of the heater elements in the heater module 10. The controller 28 is also supplied with electric power from the vehicle battery 26. The controller 28 is activated by a "on" signal from the vehicle ignition 30 so as to heat the fluid contained within the flow paths in the heater module 10, as described hereafter, whenever the vehicle ignition is in an "on" state.

An optional on/off switch 25 may be connected between the battery 26 and the controller 28 to provide on and off operation for the entire heater system by disconnecting power to the controller 28. This enables the heater system to be activated or remain in an inactive state at the selection of the vehicle driver. As described hereafter, the on/off switch 25 may also be replaced by a separate input signal to the controller 28 from an external signal source, such as a vehicle body controller, to provide for selective deactivation of the heater module 10 under certain circumstances, such as a thermal event, low battery power, etc.

Referring now to FIGS. 2–14, there is depicted one aspect of the heater module 10 according to the present invention.

The heater module 10 includes a heat exchange mass or body 40 formed of a suitable high thermally conductive material. Although the mass 40 is described as being formed of die-cast, molded, or cast or machined aluminum, other materials, either homogenous or nonhomogeneous, may also be employed. For example, the mass 40 can be formed of alumina particles, ceramic materials, etc.

The mass 40, as described in greater detail hereafter, includes a fluid flow path between an inlet 42 and an outlet 44. The inlet and outlet 42 and 44, respectively, each receives a fitting 46 for receiving a fluid sealed connection to a fluid flow conduit, element or tube, not shown. The inlet 42 will be connected to receive the pump output from the window wash fluid reservoir 20; while the outlet 44 will be connected to the spray nozzle(s) 14.

As vehicles typically have several spray nozzles 14, usually one for each of the two windshield wipers, and at least one nozzle 14 for the rear backlight or rear window wiper, it will be understood that the following description of a single heater module 10 for heating all of the fluid discharge from the fluid reservoir 20 will encompass multiple parallel paths, each containing a separate heater module, for heating fluid from the reservoir 20 for each different nozzle 14.

The heat exchange mass 40 is disposed within an enclosure or housing formed by a first cover 50 and a second mating cover 52. The first and second covers 50 and 52 have complementary mating edges. The first cover 50 has a major wall surface 54 and a surrounding peripheral lip 60.

A necked-down end portion 64 is formed in the first cover 50, and forms a tubular extension from one portion of the major wall surface 54. The necked-down portion 64 forms an enclosure for receiving a connector assembly 70 which provides electrical signals and power to the heating element (s) mounted in the joined first and second covers 50 and 52 and to a circuit board, described in detail hereafter.

The second cover 52 also has a major wall surface 56 and a surrounding peripheral lip 62 projecting therefrom. The peripheral lip 62 surrounds the entire periphery of the second major wall surface 56.

The first and second covers 50 and 52 are fixedly joined together, after the thermal mass 40 and the connector assembly 70 has been disposed within the first and second covers 50 and 52 by suitable means, such as by heat, sonic or vibration welding. By example, a peripheral groove 76 projects at least partially around the entire edge of the peripheral lip 60. The groove 76 receives a mating projection 77 extending around the peripheral lip 62 of the second cover 52. The projection 77 and groove 76 are fixedly and sealingly joined together by welding to fixedly join the covers 50 and 52 together.

Locating means are provided for locating and fixing the thermal mass 40 to the first and second covers 50 and 52. At least one and preferably a pair of circumferentially spaced slots 79 and 81, are formed on webs 83 extending between two bosses receiving the threaded fasteners on the mass 40. The slots 79 and 81 receive projections 85 and 87 carried on flanges in the first and second covers 50 and 52 at circumferentially spaced locations complementary to the location of the slots 79 81 in the mass 40. The projections 85 and 87 are welded together when the covers 50 and 52 are subjected to a sonic, heat or vibration welding process. In this matter, the thermal mass is fixedly positioned within the covers 50 and 52 when the covers 50 and 52 are themselves joined together.

Figure 3:
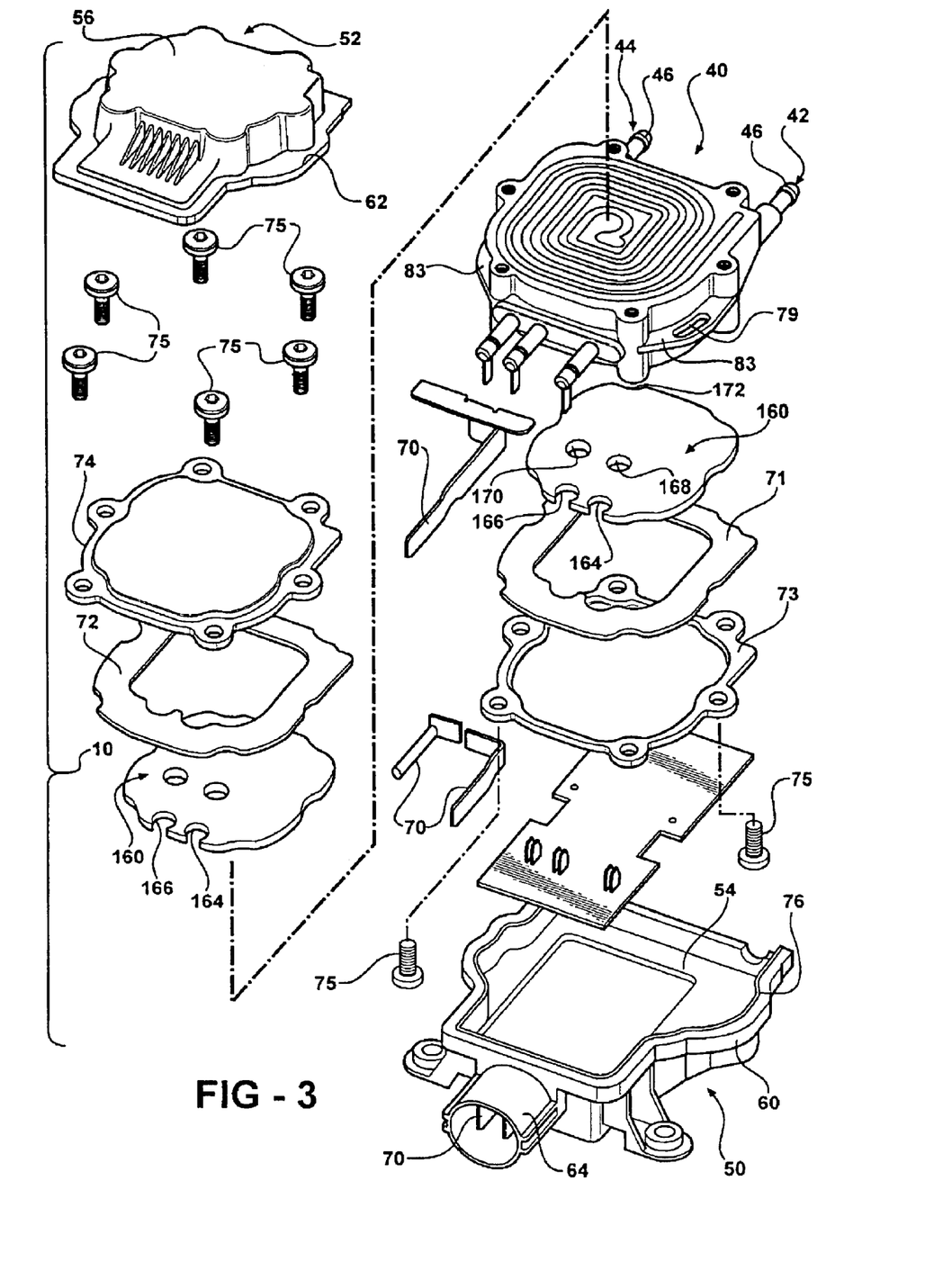
FIG. 3 is an exploded perspective view of the heater module shown in FIG. 2.

A pair of seal elements 71 and 72, each having a ring shape with another edge substantially the same as the peripheral shape of the heat exchange mass 40 are disposed on opposite surfaces of the heat exchange mass 40 as shown in FIG. 3. The seal members 71 and 72 are formed of a high thermal resistant, insulating material. The seal members 71 and 72 seal the periphery of the heat exchange mass 40.

Upper and lower closures or plates 73 and 74, each also having a shape complimentary to the shape of the heat exchange mass 40, are disposed in contact with the upper and lower seals 71 and 72, respectively, and fixed thereto by suitable fastening means, such as nuts and bolts 75, which extend through apertures in each of the upper and lower plates 73 and 74, and peripherally located bores in heat exchange mass 40. The solid peripheral edges of the plates 73 and 74 and the mating peripheral edges of the heat exchange mass 40 trap the seals 71 and 72 therebetween to seal the joint between the plates 73 and 74 and the mass 40. The upper and lower plates 73 and 74 are formed of a good thermally conductive material, such as aluminum.

As shown in detail in FIGS. 6–11, the heat exchange mass 40 has a solid cubical shape formed of a first major surface 80, a second opposed major surface 82, and four sidewall portions 84, 86, 88 and 90, interconnecting the first and second surfaces 80 and 82.

A plurality of bores 92, 94 and 96 are formed in the body 40 and project inwardly from the sidewall 84. The bores 92, 94 and 96 are each adapted for receiving one generally cylindrical heater element. As partially shown in FIG. 11, each bore 92, 94 and 96 extends through the solid central portion of the mass 40 so as to be completely surrounded by the solid material of the mass 40. This defines the mass 40 as a heat source after receiving heat from the heater elements mounted in each bore 92, 94 and 96.

In the invention, the heater elements may be formed of "calrod". Although different materials may be used, one example of a calrod construction is a Nichrome wire inside of a stainless steel sheath.

By way of example only, at least one and preferably a plurality, i.e., two or three or more individual heater elements 100, 102 and 103, are disposed in the bores 92, 94 and 96, respectively. The function of the one or more heater elements, such as heater elements 100, 102 and 103 will be described hereafter in conjunction with a description of the operation of the heater module 10.

Figure 4:
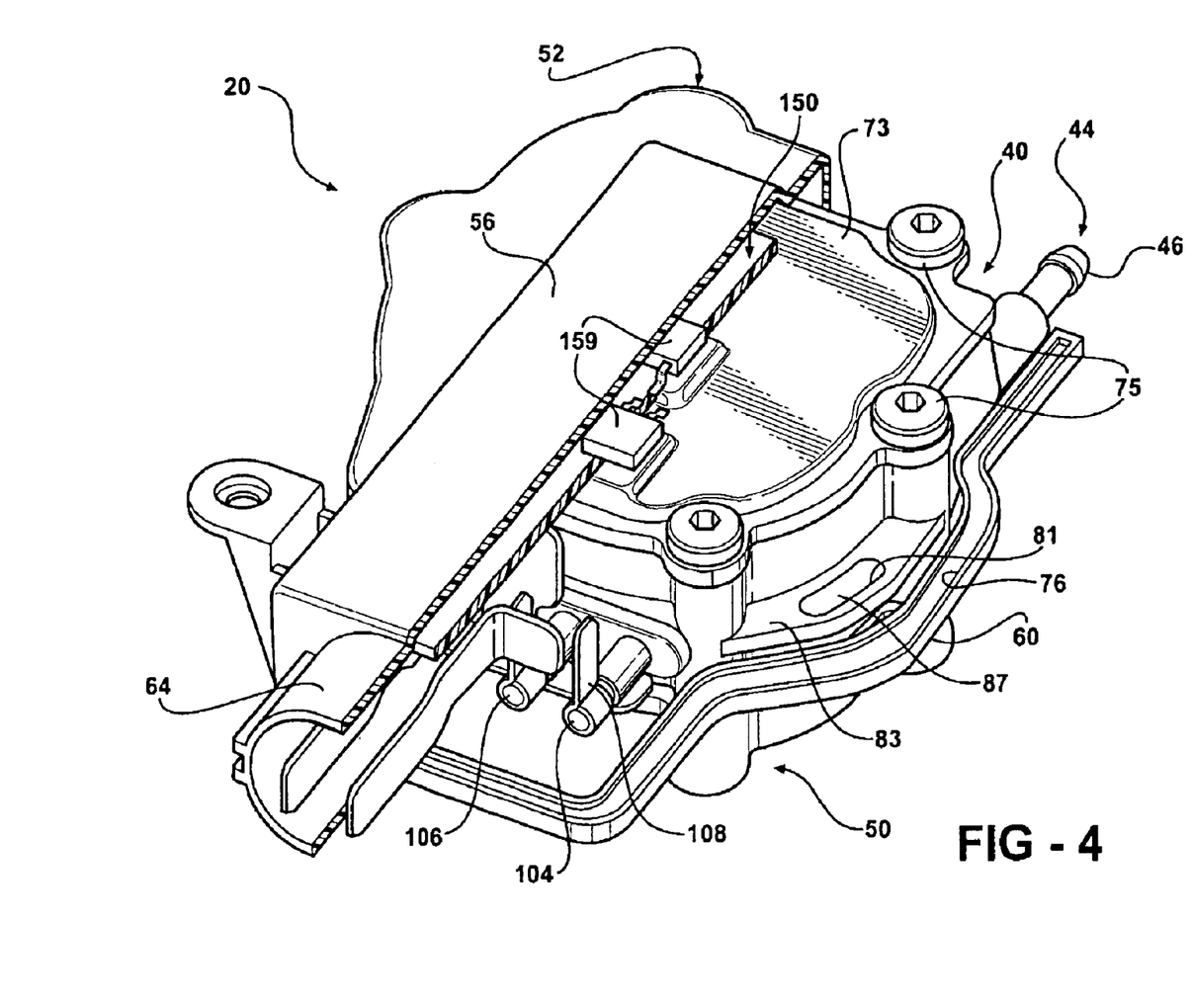
FIG. 4 is a partially broken away, perspective view of the assembled heater module shown in FIG. 2, oriented with the circuit board upward.
Figure 5:
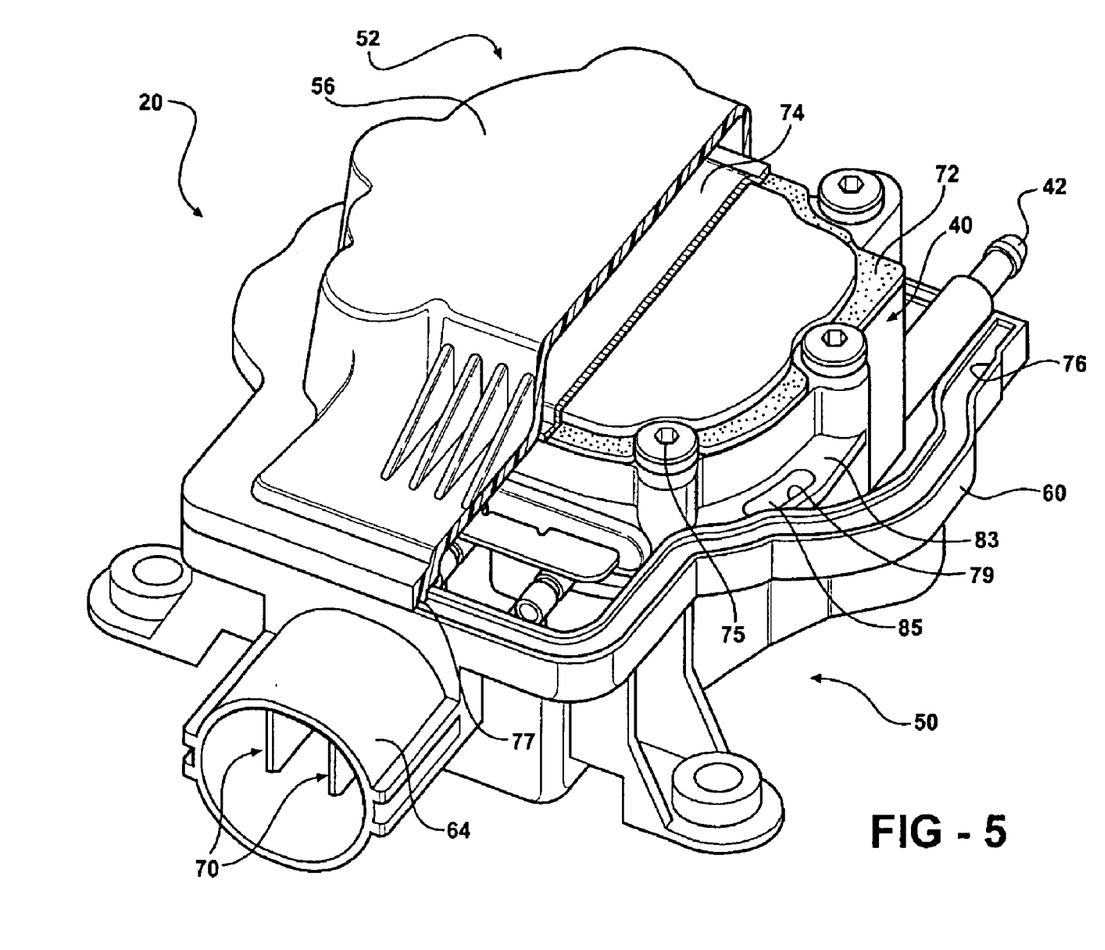
FIG. 5 is a partially broken away, perspective view of the heater module shown in FIG. 2, with the opposite surface oriented upward.
Figure 6:
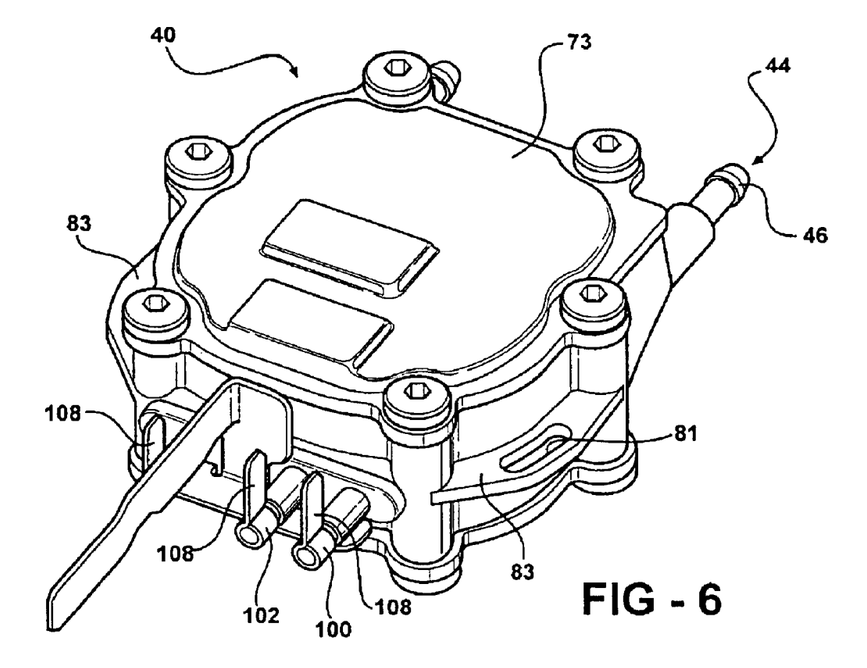
FIG. 6 is a perspective view of the heater module in the orientation of FIG. 5 of the present invention, without the covers and the circuit board.
Figure 7:
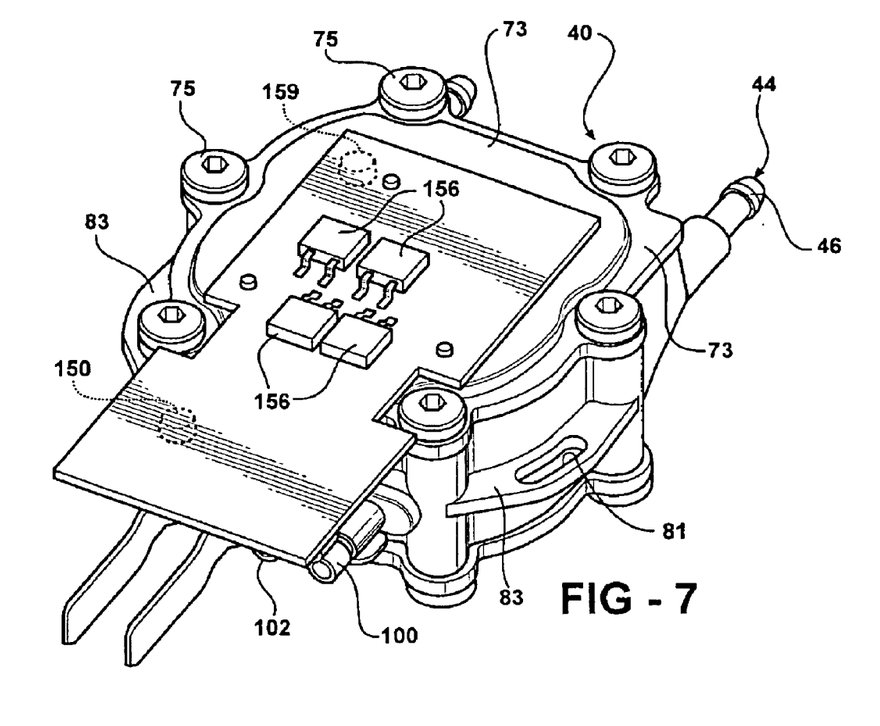
FIG. 7 is a perspective view of the circuit board side of the heater module, without the covers.

As seen in FIGS. 4 and 7, one end 104, 106 and 107 of each heater element 100, 102 and 103, respectively, projects outwardly through the sidewall 84 of the body 40. The ends 104, 106 and 107 of the heater elements 100, 102 and 103, respectively, each have individual terminals 108 extending therefrom and joined thereto by soldering, welding, etc., for connection to mating sockets or contact spring mounted on a printed circuit board 150, itself mounted by means of fasteners, i.e., screws, rivets, or adhesives, etc., to an exterior surface of the plate 73. Conductive traces in the printed circuit board 150 are connected to sockets or contacts which receive the terminals 108. Two of the connector terminals 70 are soldered to the printed circuit board 150 to receive power, ground and control signals from the vehicle electrical system.

Figure 9:
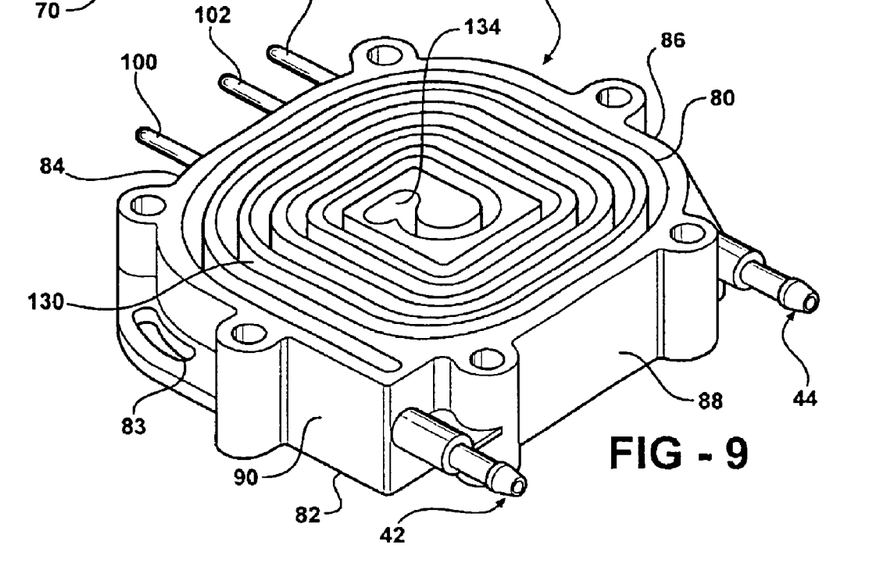
FIG. 9 is a top perspective view of the heater module thermal mass.
Figure 10:
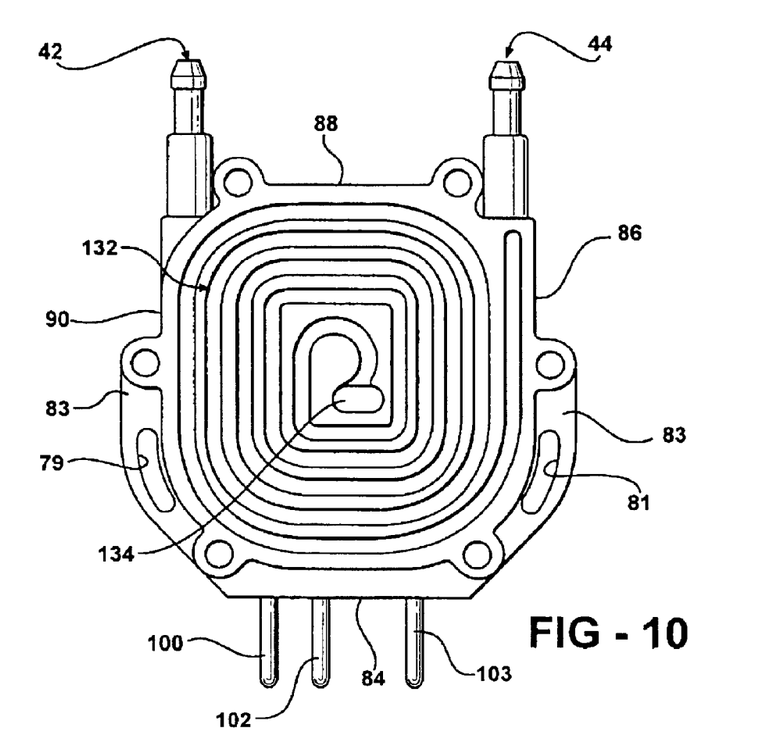
FIG. 10 is a bottom elevational view of the heater module thermal mass shown in FIGS. 6–8.
Figure 11:
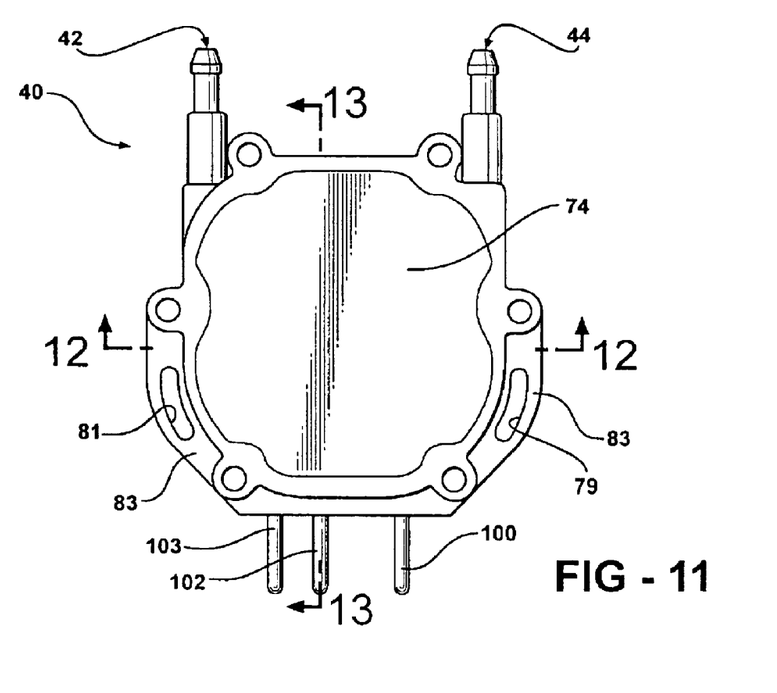
FIG. 11 is an enlarged plan view of the heater module shown in FIGS. 6–8.
Figure 12:
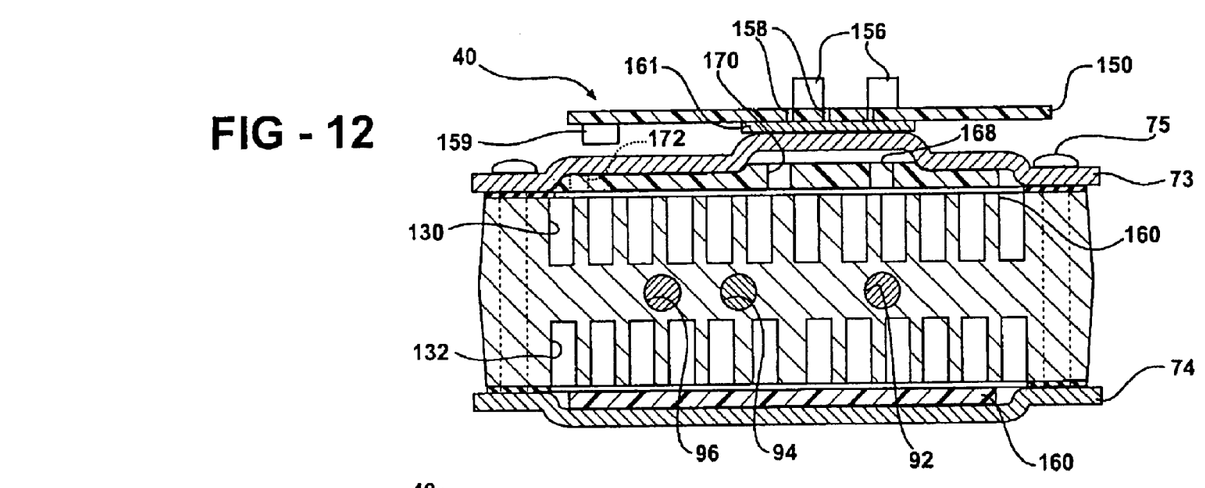
FIG. 12 is a cross-sectional view generally taken along line 12—12 in FIG. 11.
Figure 13:
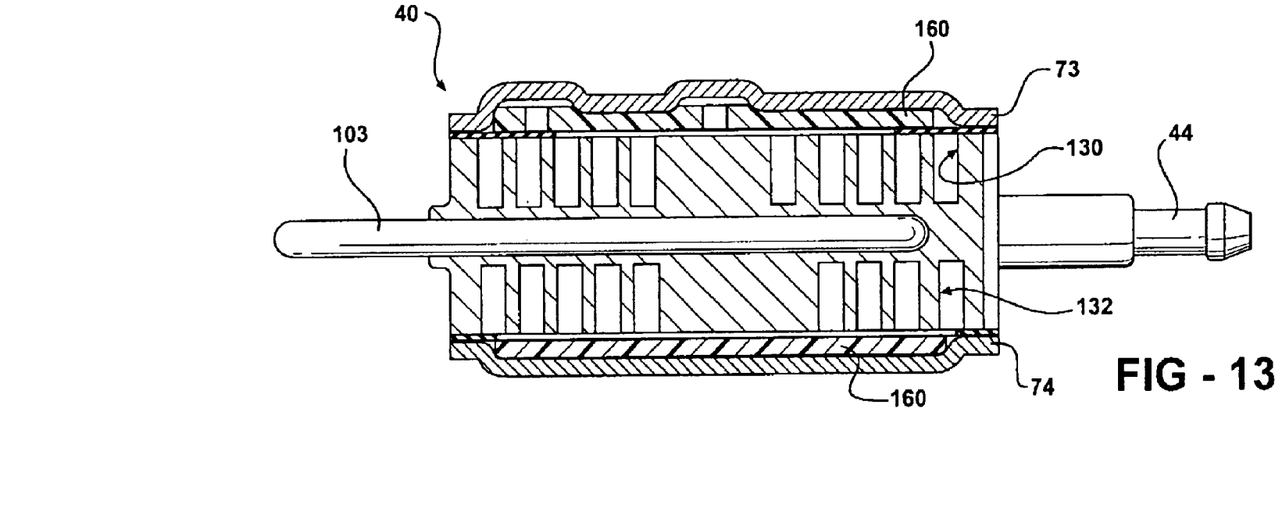
FIG. 13 is a cross-sectional view generally taken along line 13—13 in FIG. 11.

As shown in FIGS. 9 and 10, the thermally conductive mass 40 includes a fluid flow channel or path which extends from the inlet 42 to the outlet 44. The fluid flow path is, by example, a labyrinthian path formed of a first fluid flow path portion 130 and a second fluid flow path or channel 132 which are connected at a generally centrally disposed bore 134. The first fluid flow channel 130 has a generally spiral shape formed of alternating straight and arcuate sections which alternately create laminar and turbulent flow of the fluid passing through the first flow channel 130 to maximize the heat absorption of the fluid from the adjoining walls of the mass 40. Further, the first fluid flow channel 130 has an inward directed spiral shape from the inlet 42 to the bore 134 to minimize temperature differential between adjoining portions of the spiral shaped first flow channel 130.

As shown in FIG. 10, the second fluid flow channel 132 has a substantially identical spiral shape. However, fluid flow through the second fluid flow channel 132 is in an outward spiral direction from the bore 134 to the outlet 44.

Thus, fluid flow through the first and second flow channels 130 and 132 starts from the inlet 44 then continues in a spirally inward directed manner through the first flow channel 130 to the central passage or bore 134. Upon exiting the central passage 134 into the second flow channel 132, fluid flow progresses in an outward spiral direction through the second flow channel 132 to the outlet 44.

In operation, the heater module 40 will be interconnected in the vehicle wash fluid flow lines between the pump 22 and the spray nozzle(s) 14 as shown in FIG. 1. The external connector is then connected to the connector housing 70 to provide electric power from the vehicle battery 26 and the controller 28 to the heater elements 100, 102 and 103, in the heat exchange body 40.

Assuming that the first and second fluid flow channels 130 and 132 in the body 40 are filled with fluid, when the controller 28 activates the heater elements 100, 102 and 103, the heater elements 100, 102 and 103 will begin radiating heat which will immediately raise the temperature of the entire surrounding portion of the heat exchange body 40. Heat from the body 40 will, in turn, be radiated to and absorbed by the fluid disposed in the first and second flow channels 130 and 132.

The straight and arcuate portions of the first and second fluid flow channels 130 and 132 create alternating turbulent and laminar flow regions in the fluid flowing through the mass 40 which causes movement of the fluid in the first and second flow channels 130 and 132 bringing all molecules in the fluid in contact with the wall of the body 40 forming the first and second flow channels 130 and 132 to efficiently absorb the maximum amount of heat possible. This causes the temperature of the fluid to be quickly raised from ambient temperature at the inlet 42 to approximately 160° F.–170° F. at the outlet 44 in approximately sixty seconds.

The fluid in the first and second fluid flow channels 130 and 132 removes or absorbs heat from the thermal mass 40 thereby increasing the fluid temperature by physical contact with the mass 40. The heater elements 100, 102 and 103 maintain the heat of the thermal mass 40 at a predetermined temperature thereby preventing hot spots from occurring in the fluid. Normally, hot spots would occur when the fluid comes in direct contact the heater elements 100, 102 and 103. Fluid which is not in physical contact with the heater elements 100, 102 and 103 passes the heater elements 100, 102 and 103 by and does not absorb heat. By heating the thermal mass 40, the physical hot contact area is increased along with an increase in heat transfer efficiency. This requires less energy to heat the same volume of fluid.

Although a single heater element 100 may be employed as the heat source in the body 40, multiple heater elements, with two or three heater elements, 100, 102 and 103, being described by way of example only, have been found to be most advantageous. The controller 28 can activate all of the plurality of heater elements 100, 102 and 103 upon receiving a first command to dispense heated wash fluid onto the windshield 12. This generates a maximum amount of heat to the body 40 to immediately and quickly raise the temperature of the body 40 high enough to transfer sufficient heat to the fluid in the fluid flow channels 130 and 132 to raise the temperature of the fluid to the desired discharge temperature of about 65° C. to about 70° C. The multiple heater elements 100, 102 and 103 can remain in an activated state by the controller 28 if immediate and successive commands from the on/off switch 24 are supplied by the vehicle driver to supply additional charges of fluid onto the windshield 12.

At the completion of the fluid dispensing operation, and during other periods of non-fluid dispensing while the vehicle engine is running or the engine is running and a dashboard mounted switch, for example, is activated, the controller 28 can cyclically activate one or more of the heater elements, such as heater element 100, to maintain the temperature of the fluid in the first and second flow channels 130 and 132 at an elevated temperature for immediate discharge onto the windshield 12 when activated by the on/off switch 24. This minimizes electrical power requirements on the vehicle battery 26.

Although the controller 28 can provide separate switchable signals to each of the heater elements 100, 102 and 103, in order to control each heater element 100, 102 and 103 separately under program or logic control, one alternate approach includes a bi-metal element or a switch mounted between the power connections to one terminal 108 and each of the other terminals 108 connected to the additional heater elements 102 and 103. The bi-metal element can be set to open at a predetermined temperature, such as 50° C., thereby deactivating the associated heater element. This enables the additional heater elements 102 and 103, for example, to remain deactivated until a high heat requirement is initiated.

Although the following description of the use of high amperage switching devices known as MOSFETs, are used as part of the controller 28 and to provide the necessary high current, typically 50 amps at 12 volts, to the heating elements 100, 102 and 103 in the thermal mass 40, other high amperage switching devices may also be employed. Any number of MOSFETs 156 can be mounted in any configuration on the printed circuit board 150.

A plurality of bores 158 are optionally formed through the printed circuit board 150. The bores 158 improve heat flow between the switching devices on the printed circuit board (PCB) 150 and the underlying first plate 73.

A temperature sensor 159, such as a PTC, is mounted on the printed circuit board 150, typically over or adjacent to the bores 158. The temperature sensor 159 measures the temperature of the printed circuit board 150 and provides a temperature proportional signal to the controller 28 which is used by the controller 28 to control the on/off cycle of the heater elements 100, 102 and 103.

Figure 8:
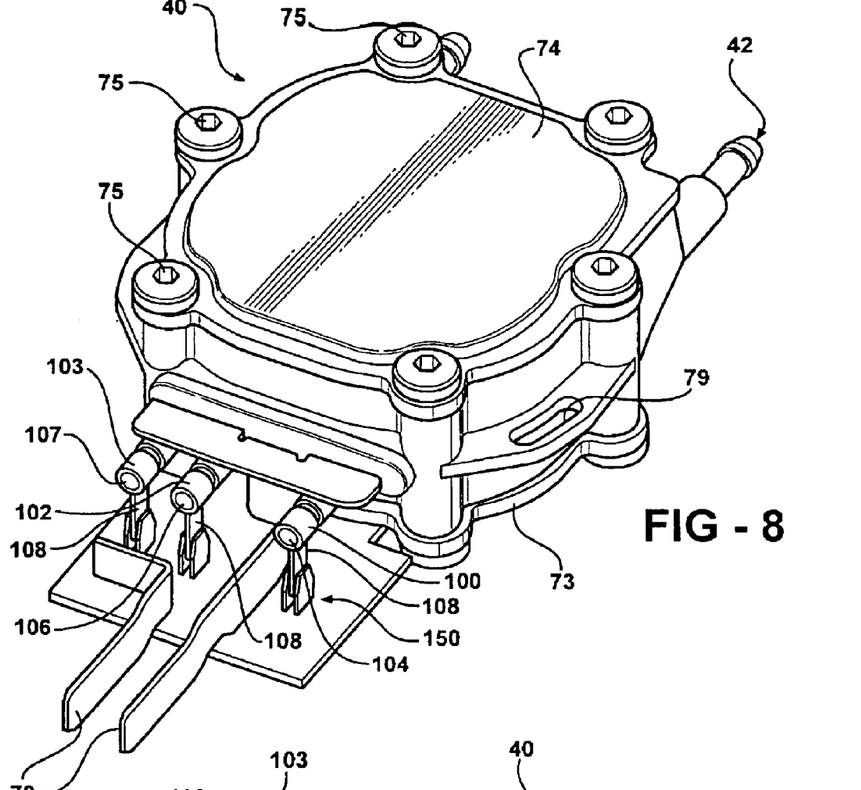
FIG. 8 is a perspective view of the opposite orientation of the heater module shown in FIG. 7.

To further enhance transfer of the heat generated by the MOSFETs 156 to the first plate 140, a highly conductive pad or plate 161, hereafter referred to as a sill pad 161, is interposed in contact between the printed circuit board 150 and the first plate 23 as shown in FIGS. 3, 8 and 9. The sill pad 161 typically has a planar shape and dimensions to extend over at least a portion of the first plate 73. The pad 161 isolates stray electrical currents to negative ground through the screws 75, provides a positive contact between the MOSFETs and the thermal mass 40, and stabilizes heat loss through the adjacent cover by maintaining the temperature of the plate 73 at a higher temperature to thereby create a lower temperature differential or gradient with respect to the thermal mass 40.

The sill pad 161 preferably has a higher thermal conductivity than the thermal conductivity of the plate 73 to efficiently draw heat generated by the MOSFETs 156 to the plate 73 thereby maintaining the temperature of the plate 73 at an elevated temperature. This elevated temperature of the plate 73 is higher than the normal temperature of the plate 73 caused by heat escaping from the sides of the thermal mass 40 around the seals 71 and 72.

It is known that during sub-freezing temperatures, wash fluids which are formed substantially of water are subject to freezing. The expansion of the frozen or semi-frozen fluid causes pressure to be exerted against the surrounding components of the heater module 10 which could lead to leaks or to the complete destruction of the heater module 10.

As shown in FIGS. 3, 5 and 11–14, a fluid expansion means 160 is carried in the heater module 10 for reversibly allowing expansion of the fluid in the fluid flow path when the fluid changes phase from a liquid to a substantially solid state. The fluid expansion means, in one aspect of the present invention, is in the form of a thin compressive member such as a generally planar member, formed of a closed cell foam.

One example of a suitable material which could be used to form the fluid expansion means is a closed cell polyolefin foam sold by Voltek, division of Sekisui America Corp., as product number VOLARA type LM. Another possible material is a polyvinyl chloride allied foam, trade name C/3002 or C-2301 from Specialty Composites Division Cabot Safety Corp., Indianapolis, Ind. 46254.

The fluid expansion means 160 has sufficient rigidity under normal fluid operating pressures in the mass 40 to resist compression. The fluid expansion means or member 160 is disposed over an inner edge of each of the seals 71 and 72 on both sides of the thermal mass 30 and has a substantial center portion facing and exposed to the fluid through the open ends of the channels in the thermal mass 40. The fluid expansion member 160 has sufficient rigidity to resist expansion or compression under the normal operating pressures of the fluid in the heater module 10. However, at the substantially higher forces exerted by freezing and expansion of the fluid in the channels, the member 160 is capable of compression as shown in phantom in FIGS. 12 and 13 to allow space for the expanded frozen or semi-frozen fluid.

The fluid expansion member 160 has shape memory so as to return to its normally generally planar shape, completely filling an internal cavity 162 formed in an enlarged bulge in each cover 71 and 73.

The fluid expansion member 160 is compressed by the fastening on the plate 73 and 74 to the mass to expand slightly into the channels in the mass 40 and into substantial contact with the surfaces of the thermal mass 40 to close off the open ends of each of the channels in the fluid flow path through the thermal mass 40.

Figure 14:
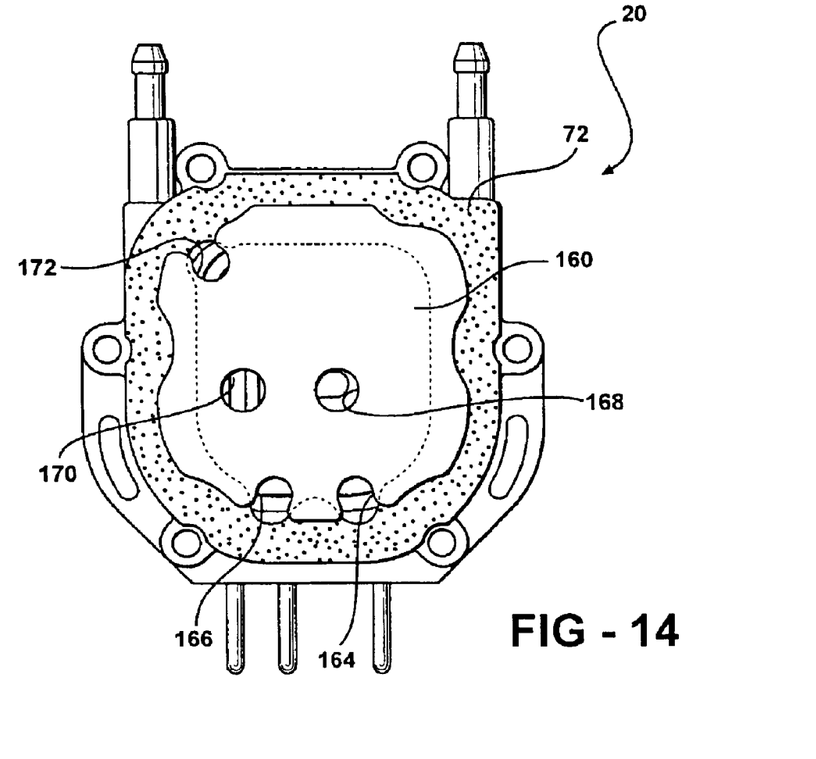
FIG. 14 is a plan view of the freeze protection element shown mounted over the seal end one surface of the thermal conductive.

As shown in FIG. 14, the fluid expansion member 160 has additional features to facilitate its use in the heater module 10. A pair of open ended recesses 164 and 166 are formed along one edge of the fluid expansion member 160. The recesses 164 and 166 overlay a portion of the underlying fluid flow channel of the thermal conductive mass 40 to permit a small amount of the fluid in the fluid flow channel to flow through the recesses 164 and 166 against the inside surface of the plate 73 or 74. The high power consuming electronic switching devices, such as the MOSFETs 156, are located immediately opposite an enlargement in the plate 73. The switching devices 156 are cooled by the flow of water so as to maintain the switching devices 156 at a nominal operating temperature. Additional apertures 168 and 170 are formed in an intermediate portion of the thermal expansion member 160 for a similar purpose to allow fluid flow through the channels in the thermal conductive mass to flow against an inner surface of the adjacent plate 73 to remove heat from the switching devices 156 located immediately there over on the circuit board 150.

An additional open-ended recess: 172 is formed on another edge portion of the thermal expansion member 160. The recess 172 underlies the position of the thermal temperature sensor 159 mounted on the circuit board 150. Fluid flow through the recess 172 provides a more accurate temperature measurement by the temperature sensor 159 since it is closer to the fluid flowing through the channels in the thermal mass 40.

Figure 16:
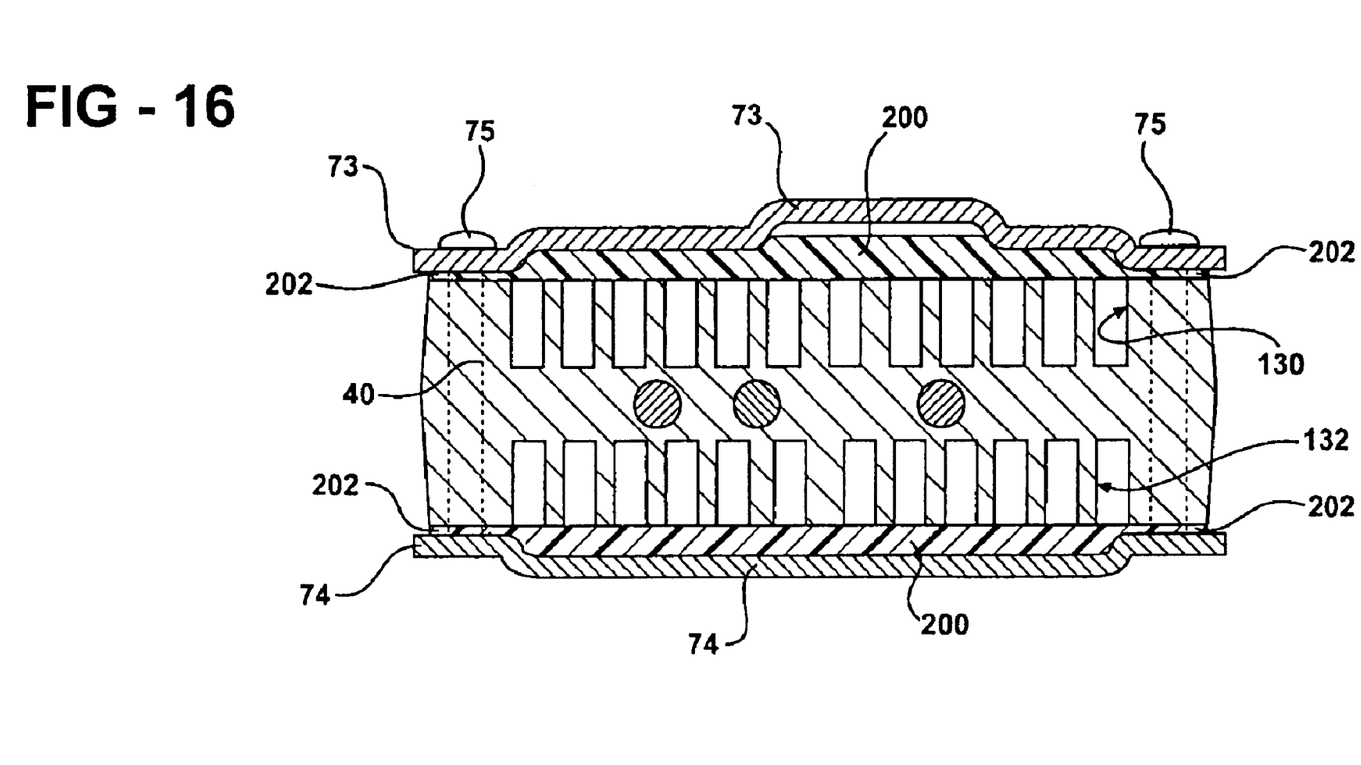
FIG. 16 is a cross-sectional view, generally similar to FIG. 12, but showing another aspect of the present invention.

In another aspect of the fluid expansion means 200 shown in FIG. 16, the fluid expansion means 200 is configured to eliminate the seal 71 and 72. The peripheral edge portion 202 of the fluid expansion means or element is compressed when the corresponding plate 73 or 74 is securely fixed to the thermal mass 40 by means of the fasteners 75. Alternately, the peripheral edge portion 202 of the fluid expansion means 200 can be heat and pressure compressed to a smaller thickness than the central portion of the fluid expansion element 200.

Figure 15:
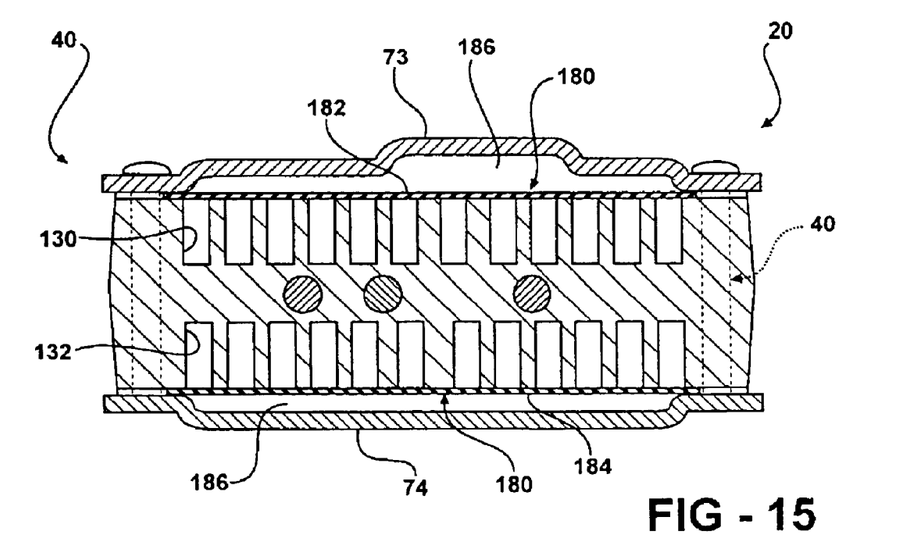
FIG. 15 is a side elevational view of another aspect of a heater module which an alternate fluid expansion member according to the present invention.

Referring to another aspect of the fluid expansion means shown in FIG. 15, the fluid expansion means 180 is formed by the seal members 182 and 184 having a solid shape over their entire surface area. At least one of the thus formed seal members 182 and 184 is formed with sufficient rigidity to resist expansion when exposed to the normal pressures of fluid flowing through the open ended channels in the thermal mass 40. However, any of the seal members 182 and 184 are capable of expansion into an interior cavity or chamber 186 formed in the enlarged portion of the plate 73 to accommodate the expanded frozen or semi-frozen fluid from the mass 40. When the fluid subsequently changes phase back to a liquid state, the seal members 182 and 184 will assume their original shape wherein each .of the seal members 182 and 184 is disposed in contact with the open ends of the channels closing off the open end of the channels in the fluid flow path to maintain the desired labyrinthian flow of fluid through the thermal mass 40 as described above.

In summary, there has been disclosed a fluid heater apparatus having a unique fluid expansion means which accommodates expansion of the fluid flowing through the fluid heater when the fluid undergoes a phase change to a solid or semi-solid state. The fluid expansion means has shaped memory to enable it to reassume its normal shape after the fluid has returned to a liquid phase.

What is claimed is:

1. A heater apparatus for heating fluid, the heater apparatus comprising:

a thermally conductive mass;

heating means, thermally coupled to the thermally conductive mass, for imparting heat to the thermally conductive mass;

a fluid flow path formed in the mass between an inlet and an outlet, the fluid flow path coupled in heat transfer relation to the heating means so that fluid in the fluid flow path absorbs heat from the thermally conductive mass, the fluid flow path open to the exterior of the thermally conductive mass;

a housing carrying the thermally conductive mass in an interior cavity; and fluid expansion means, coupled to the mass, for reversibly allowing phase change expansion of fluid in the fluid flow path.

2. The heater apparatus of claim 1 further comprising:

control means, connected to the heating means, for activating the heating means.

3. The heater apparatus of claim 1 wherein the control means further comprises:

a printed circuit board.

4. The heater apparatus of claim 1 wherein the control means further comprises:

temperature sensor means, coupled to the control means, for generating an output signal proportional to the temperature of the thermally conductive mass.

5. The heater apparatus of claim 1 wherein the fluid expansion means comprises:

a compressible member mounted between the thermally conductive mass and a closure mounted on the mass.

6. The heater apparatus of claim 5 wherein:

the compressible member is formed of a closed cell foam.

7. The heater apparatus of claim 1 wherein the fluid expansion means comprises:

a closure having an enlarged portion defining a hollow interior chamber overlaying the open ends of the fluid flow channels in the thermally conductive mass; and expandable means, extending over the open ends of the fluid flow channels and disposed in substantial contact with the thermally conductive mass over the open-ended channels under normal fluid flow pressures, for expanding into the interior chamber in the closure during a phase change expansion of the fluid.

8. The heater apparatus of claim 1 wherein the fluid flow path comprises:

a first flow path portion extending across one surface of the thermally conductive mass; and a second flow path portion extending across an opposed surface of the thermally conductive mass, the first and second flow path portions disposed in fluid flow communication.

9. The heater apparatus of claim 8 wherein the first and second flow path portions are disposed in fluid flow communication substantially at the center of the thermally conductive mass.

10. The heater apparatus of claim 1 wherein the heating means comprises:
a least one heater element mounted in the mass.

11. The heater apparatus of claim 1 wherein the heating means comprises:
a plurality of heater elements mounted in the mass.

12. The heater apparatus of claim 11 further comprising:
a controller for controlling the activation of each of the heater elements.

13. The heater apparatus of claim 1 wherein:
the heating means is disposed in the thermally conductive mass and substantially encompassed by the fluid flow path.

14. The heater apparatus of claim 1 further comprising:
a closure fixed to one surface of the mass; and
seal means for fluidically sealing the thermally conductive mass to the closure.

15. The heater apparatus of claim 14 wherein the seal means comprises:
an O-ring disposed between the peripheral portions of the closure and the thermally conductive mass.

16. The heater apparatus of claim 14 wherein the seal means comprises:
the fluid expansion means having a peripheral edge portion disposed between the closure and the thermally conductive mass for fluidically sealing the thermally conductive mass to the closure.

17. A heater apparatus for heating fluid the heater apparatus comprising:
a thermally conductive mass;
a fluid flow path formed of a first flow path portion extending across one surface of the thermally conductive mass and a second flow path portion extending across an opposed surface of the thermally conductive mass, the first and second flow path portions disposed in fluid flow communication through the thermally conductive mass, the fluid flow path defined by open-ended channels formed in the thermally conductive mass, the open-ends of the channels facing outward from the thermally conductive mass;
at least one heating element thermally mounted in the thermally conductive mass and substantially contacted by the mass, the heating means imparting heat to the thermally conductive mass so that fluid in the first and second flow path portions absorbs heat from the thermally conductive mass;
control means, including power switch means connected to the at least one heating element, for activating the at least one heating element;
a housing carrying the thermally conductive mass in an interior cavity; and
fluid expansion means mounted on the mass for reversibly allowing phase change expansion of fluid in the fluid flow path when the fluid is in at least a substantially solid state.

18. The heater apparatus of claim 17 further comprises:
a closure fixed to the mass for closing the fluid flow channels in the mass; and
seal means, mounted over a portion of the fluid flow path in the thermally conductive mass to fluidically seal the thermally conductive mass to the housing.

19. The heater apparatus of claim 17 wherein the control means further comprises:
a printed circuit board.

20. The heater apparatus of claim 17 wherein the control means further comprises:
temperature sensor means, coupled to the control means, for generating an output signal proportional to the temperature of the thermally conductive mass.

21. The heater apparatus of claim 17 wherein the fluid expansion means comprises:
a compressible member.

22. The heater apparatus of claim 21 wherein:
the compressible member is formed of a closed cell foam.

23. The heater apparatus of claim 17 wherein the fluid expansion means comprises:
the closure having an enlarged portion defining a hollow interior chamber overlaying the open ends of the fluid flow channels in the thermally conductive mass; and
expandable means, extending over the open ends of the fluid flow channels and disposed in substantial contact with the thermally conductive mass over the open-ended channels under normal fluid flow pressures, for expanding into the interior chamber in the closure during a phase change expansion of the fluid.

24. The heater apparatus of claim 17 wherein the fluid flow path comprises:
a first flow path portion extending across one surface of the thermally conductive mass; and
a second flow path portion extending across an opposed surface of the thermally conductive mass, the first and second flow path portions disposed in fluid flow communication.

25. The heater apparatus of claim 17 wherein the first and second flow path portions are disposed in fluid flow communication substantially at the center of the thermally conductive mass.

26. The heater apparatus of claim 17 wherein the heating means comprises:
a plurality of heater elements mounted in the mass.

27. The heater apparatus of claim 18 wherein the seal means comprises:
an O-ring disposed between the peripheral portions of the closure and the thermally conductive mass.

28. The heater apparatus of claim 18 wherein the seal means comprises:
the fluid expansion means having a peripheral edge portion disposed between the closure and the thermally conductive mass for fluidically sealing the thermally conductive mass to the closure.

29. A vehicle window wash apparatus comprises:
a fluid source for supplying wash fluid;
a fluid discharge device fluidically coupled to the fluid source for discharging fluid from the reservoir;
a heater means disposed in fluid flow communication between the fluid source and the fluid discharge device;
a controller, coupled to the heater means for supplying power to the heater means;
the heater apparatus including:
a thermally conductive mass having an inlet and an outlet;
a fluid flow path formed in the mass between the inlet and the outlet, the fluid flow path substantially enveloping the heating means so that fluid in the fluid flow path absorbs heat from the thermally conductive mass;
control means, connected to the heating means, for activating the heating means; the fluid flow path open to the exterior of the thermally conductive mass;

a housing carrying the thermally conductive mass in an interior cavity; and fluid expansion means carried in the housing for reversibly allowing expansion of fluid in the fluid flow path when the fluid is in at least a substantially solid state.

30. The heater apparatus of claim 29 wherein the control means further comprises:

temperature sensor means, coupled to the control means, for generating an output signal proportional to the temperature of the thermally conductive mass.

31. The heater apparatus of claim 29 further comprising:

a closure fixed to the mass; and seal means, for fluidically sealing the thermally conductive mass to the closure.

32. The heater apparatus of claim 29 wherein the control means further comprises:

a printed circuit board.

33. The heater apparatus of claim 29 wherein the control means further comprises:

temperature sensor means, coupled to the control means, for generating an output signal proportional to the temperature of the thermally conductive mass.

34. The heater apparatus of claim 29 wherein the fluid expansion means comprises:

a compressible member.

35. The heater apparatus of claim 29 wherein:

the compressible member is formed of a closed cell foam.

36. The heater apparatus of claim 29 wherein the fluid expansion means comprises:

a closure having an enlarged portion defining a hollow interior chamber overlaying the open ends of the fluid flow channels in the thermally conductive mass; and expandable means, extending over the open ends of the fluid flow channels and disposed in substantial contact with the thermally conductive mass over the open-ended channels under normal fluid flow pressures, for expanding into the interior chamber in the closure during a phase change expansion of the fluid.

37. The heater apparatus of claim 29 wherein the fluid flow path comprises:

a first flow path portion extending across one surface of the thermally conductive mass; and a second flow path portion extending across an opposed surface of the thermally conductive mass, the first and second flow path portions disposed in fluid flow communication.

38. The heater apparatus of claim 29 wherein the first and second flow path portions are disposed in fluid flow communication substantially at the center of the thermally conductive mass.

39. The heater apparatus of claim 29 wherein the heating means comprises:

a plurality of heater elements mounted in the mass.

40. The heater apparatus of claim 31 wherein the seal means comprises:

an O-ring disposed between the peripheral portions of the closure and the thermally conductive mass.

41. The heater apparatus of claim 31 wherein the seal means comprises:

the fluid expansion means having a peripheral edge portion disposed between the closure and the thermally conductive mass for fluidically sealing the thermally conductive mass to the closure.

* * * * *